(No Model.)

J. LANE.
CULTIVATOR.

No. 314,143. Patented Mar. 17, 1885.

Witnesses.
Henry Frankfurter
Sam B. Dover

Inventor.
John Lane.

UNITED STATES PATENT OFFICE.

JOHN LANE, OF HYDE PARK, ILLINOIS.

CULTIVATOR.

SPECIFICATION forming part of Letters Patent No. 314,143, dated March 17, 1885.

Application filed November 10, 1884. (No model.)

*To all whom it may concern:*

Be it known that I, JOHN LANE, a citizen of the United States, residing at Hyde Park, in the county of Cook and State of Illinois, have invented a new and useful Improvement in Cultivators, of which the following is a specification.

My invention relates to cultivators having parallel gangs of the species in which one gang and wheel may advance ahead of the other without changing their parallelism.

My invention consists in an improved construction and attachment of the runner, as hereinafter shown.

Figure 1:
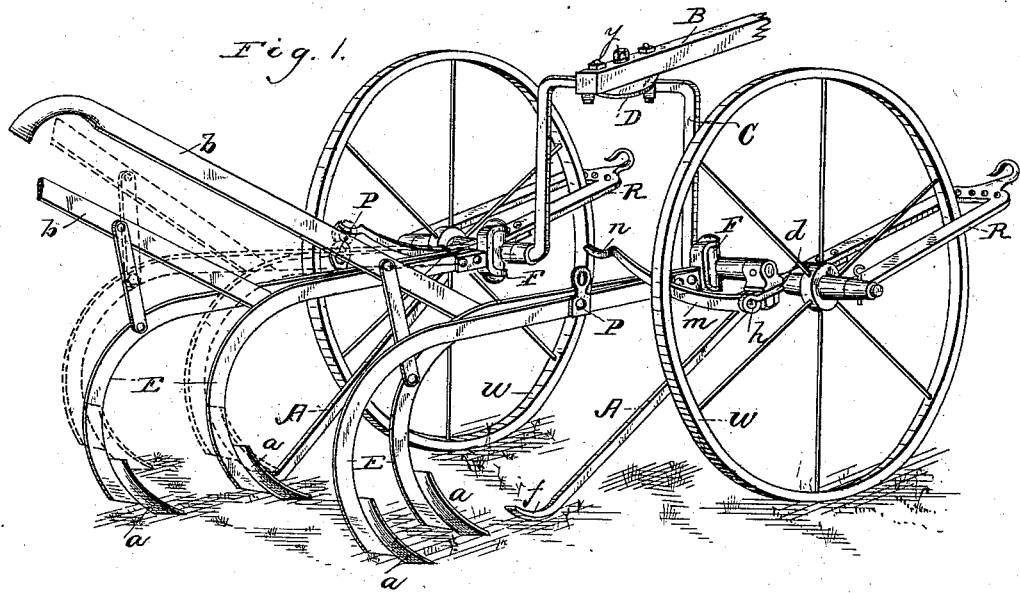
Figure 2:
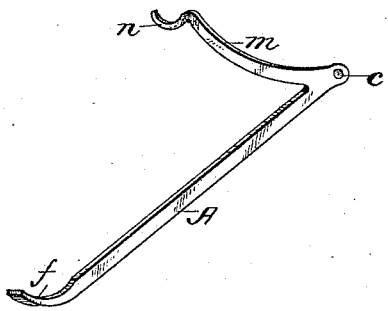
Figure 3:
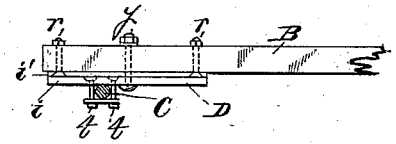
Figure 4:
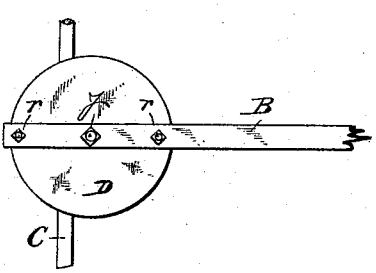

Referring to the drawings, like letters refer to like parts, in which Figure 1 is a perspective view of my improved cultivator. Fig. 2 is a perspective view, enlarged, of the runner A, showing its construction. Figs. 3 and 4 are detail views showing how a tongue, B, may be connected to the axle C by means of the fifth-wheel D.

The cultivator may be provided with the ordinary drag-bars or gangs, E, provided with shovels $a$, handles $b$, and couplings F, the axle C, provided with wheel-arms $d$, pivotally connected to the axle, draft-rods R, and wheels W, as shown, or any other known equivalents therefor may be used instead.

A represents my improved runner, consisting of a forked bar, or it may be a bar of iron bent forked, as shown, one fork or end forming the foot $f$, the other end forming the arm $m$, as shown, provided with the perforation $c$ for connecting to the cultivator the foot $f$ as a sled or foot to rest upon the ground in supporting the elevated gang and the arm $m$, to which the elevated gang may be suspended. The said runner A is pivotally attached to the cultivator by means of the hinged joint $h$, permitting up-and-down play or movement only, by which said runner is held rigidly upright and parallel with the wheels, while permitted to swing vertically. The said hinged joint $h$ may be connected or constructed upon the inner end of the wheel-arm $d$, as shown, as will be understood by Fig. 1.

P is an eye-ring attached to the gang, and $n$ is a hook formed upon the end of the arm $m$, which may be used in suspending the gang, as will be understood by the drawings.

The dotted lines in Fig. 1 show the gang elevated, and supported thus elevated by the runner A, with its foot $f$ resting upon the ground and its arm $m$ connected to the gang.

In operation the cultivator is drawn forward by the draft-rod. Either side of the cultivator may advance ahead of the other without changing the parallelism of the gangs, wheels, and runners. The runners slide along upon the ground parallel with the wheels, ever ready to support the elevated gang, and, when the gangs are carried upon the runners, the axle and draft-rods are free to tip either forward or backward in passing over rough lands or obstructions, and the gangs thereby less liable than heretofore to be thrown from their suspended position by such obstructions and rough lands.

The construction of the runner A with its foot and arm in one piece, and the attachment of same to the cultivator, as shown, affords a simple and inexpensive construction, and enables the cultivator to do its work in a better and more satisfactory manner than heretofore.

Having thus set forth my invention, I claim—

1. In a cultivator, the runner A, consisting of a forked bar provided with the foot $f$ and arm $m$, adapted to sustain the gang in an elevated position, said runner connected by a hinged joint permitting vertical play, while holding the said runners and the thereto-suspended gangs rigidly upright and parallel with the wheels, substantially as and for the purpose set forth.

2. In a cultivator, the combination of an axle having wheel-arms pivotally connected thereto, the runner A, consisting of the forked bar pivotally connected to the said wheel-arm and adapted to support the gang independent of the axle, substantially as and for the purpose set forth.

JOHN LANE.

Witnesses:
M. E. LANE,
R. H. WILSON.